(12) United States Patent
Savrun et al.

(10) Patent No.: US 9,149,795 B2
(45) Date of Patent: Oct. 6, 2015

(54) CORROSION RESISTANT CATALYSTS FOR DECOMPOSITION OF LIQUID MONOPROPELLANTS

(75) Inventors: Ender Savrun, Seattle, WA (US); Stephanie J. Sawhill, Bothell, WA (US)

(73) Assignee: Sienna Technologies, Inc., Woodinville, WA (US)

( * ) Notice: Subject to any disclaimer, the term of this patent is extended or adjusted under 35 U.S.C. 154(b) by 1124 days.

(21) Appl. No.: 13/115,814

(22) Filed: May 25, 2011

(65) Prior Publication Data

US 2012/0297779 A1 Nov. 29, 2012

(51) Int. Cl.

| | | |
|---|---|---|
| *B01J 21/06* | (2006.01) | |
| *B01J 23/46* | (2006.01) | |
| *F02K 9/70* | (2006.01) | |
| *F02K 9/80* | (2006.01) | |
| *F02C 3/14* | (2006.01) | |
| *B01J 37/32* | (2006.01) | |
| *B01J 23/40* | (2006.01) | |
| *B01J 35/00* | (2006.01) | |
| *B01J 37/00* | (2006.01) | |
| *B01J 37/02* | (2006.01) | |

(52) U.S. Cl.
CPC ................ *B01J 21/066* (2013.01); *B01J 23/40* (2013.01); *B01J 23/468* (2013.01); *B01J 35/002* (2013.01); *B01J 37/0018* (2013.01); *B01J 37/0036* (2013.01); *B01J 37/0201* (2013.01); *B01J 37/32* (2013.01); *F02C 3/14* (2013.01); *F02K 9/70* (2013.01); *F02K 9/80* (2013.01)

(58) Field of Classification Search
CPC .......... F02C 3/14; B01J 21/066; B01J 23/46; B01J 23/40; B01J 35/002; B01J 37/32; B01J 37/0018; B01J 37/02011; B01J 37/0036; B01J 21/10; B01J 23/58; B01J 23/62; B01J 23/626; B01J 23/63; B01J 23/6445; B01J 2219/00824; B01J 2219/00835; F02K 9/70; F02K 9/80; C04B 35/00
USPC .................................. 60/246–247, 257–260
See application file for complete search history.

(56) References Cited

U.S. PATENT DOCUMENTS

| | | | | |
|---|---|---|---|---|
| 3,298,182 | A * | 1/1967 | Webb ............................. | 60/251 |
| 5,780,157 | A * | 7/1998 | Tuffias et al. ................ | 428/408 |
| 5,855,828 | A * | 1/1999 | Tuffias et al. ................ | 264/29.1 |
| 2002/0028520 | A1* | 3/2002 | Boschetti et al. ............. | 436/518 |
| 2007/0184971 | A1* | 8/2007 | Fokema et al. ............... | 502/177 |

(Continued)

OTHER PUBLICATIONS

Tejuca et al., "Structure and Reactivity of Perovskite-Type Oxides," Advance in Catalysis, vol. 36, pp. 237-328; 1989.
Rodrigues, et al., "Nitride and Carbide of Molybdenum and Tungsten as Substitutes of Iridium for the Catalysts Used for Space Communication," Catalysts Letters, 45 (1997) 1-3.

(Continued)

*Primary Examiner* — Phutthiwat Wongwian
*Assistant Examiner* — Carlos A Rivera
(74) *Attorney, Agent, or Firm* — Lowe Graham Jones, PLLC

(57) ABSTRACT

Ceramic catalyst carriers that are mechanically, thermally and chemically stable in a ionic salt monopropellant decomposition environment and high temperature catalysts for decomposition of liquid high-energy-density monopropellants are disclosed. The ceramic catalyst carrier has excellent thermal shock resistance, good compatibility with the active metal coating and metal coating deposition processes, melting point above 1800° C., chemical resistance to steam, nitrogen oxides and acids, resistance to sintering to prevent void formation, and the absence of phase transition associated with volumetric changes at temperatures up to and beyond 1800° C.

6 Claims, 2 Drawing Sheets

(56) References Cited

U.S. PATENT DOCUMENTS

2008/0064914 A1* 3/2008 Fokema et al. ............ 588/403
2008/0118804 A1* 5/2008 Tucker et al. ............. 429/30

OTHER PUBLICATIONS

Kirchnerova et al., "Design Criteria for High-Temperature Combustion Catalysts," Catalysts Letters 67 (2000) 175-181.

* cited by examiner

CORROSION RESISTANT CATALYSTS FOR DECOMPOSITION OF LIQUID MONOPROPELLANTS

FIELD OF THE INVENTION

This invention relates generally to high temperature, corrosion resistant catalysts for decomposition of liquid high-energy-density ionic salt monopropellants.

BACKGROUND OF THE INVENTION

Thrust is produced in a monopropellant thruster, or reaction engine, in the following stages: (1) A monopropellant fluid (liquid or gaseous) that is usually pressurized is injected onto a catalyst bed. (2) When the monopropellant comes in contact with the catalyst it decomposes, or ignites. Decomposition of the monopropellant may occur in one reaction or in multiple sequential reactions. Then (3) the decomposition products are exhausted through the exit cone or nozzle to create thrust. The thrust, or specific impulse, is dependant on many variable including engine design, size, and energy produced by propellant decomposition.

A typical monopropellant catalyst consists of discrete active metal particles dispersed on a ceramic carrier, or substrate. The active metal particles catalyze, or reduce the activation energy for, monopropellant decomposition upon contact. The purpose of the catalyst substrate is to (i) increase the surface area of active metal to provide more sites for propellant decomposition and (ii) stabilize the active metal particles, i.e., prevent them from migrating or sintering, which leads to particle growth and/or loss of active metal surface area. During thruster operation, the substrate is exposed to the propellant and intermediate species that form during propellant decomposition as well as decomposition products that are extremely corrosive, particularly at elevated temperatures (>1000° C.). This leads to degradation of the substrate, followed by catalyst deactivation. A long life monopropellant catalyst must be composed of a substrate that is resistant to corrosion from the propellant and its decomposition products and intermediate species and resistant to degradation under thruster operating conditions.

Reduced toxicity high-energy-density ionic salt monopropellants, including but not limited to monopropellants containing an oxidizer such as hydroxylammonium nitrate (HAN, [HO—$NH_3^+$]$NO_3^-$) and one or more fuels in highly concentrated solutions containing water, ethanol or a suitable solvent or without a solvent are described as replacements for hydrazine-based propellants. The new monopropellants, which will hereinafter sometimes be referred to as ionic salt monopropellants or high-energy-density ionic salt monopropellants and which include HAN-based ionic salt monopropellants, offer lower toxicity, lower flammability, lower vapor pressure, lower freezing-point temperature, and higher density-specific impulse than hydrazine-based monopropellants.

Liquid monopropellants, including but not limited to HAN-based ionic salt monopropellants, can be decomposed by passing them over a solid catalyst bed. The catalyst decreases the activation energy required for monopropellant decomposition, thus allowing for combustion at lower temperatures than required for pure thermal decomposition. However, the decomposition and combustion reactions degrade the catalyst. As a result, a typical monopropellant thruster can only be fired for a limited number of pulses, or until the catalyst fails due to loss of catalytic mass or loss of catalyst activity as described above.

The high-adiabatic-decomposition-temperatures of the described HAN-based ionic salt monopropellants render conventional catalysts ineffective when applied to these formulations. The adiabatic flame temperature of the HAN-based ionic salt monopropellants exceeds 1800° C., whereas hydrazine possesses an adiabatic flame temperature of only 900° C. In addition, decomposition of the HAN-based ionic salt monopropellants produces highly oxidizing species such as oxygen ($O_2$), acidic species such as $HNO_3$, and water vapor that are highly corrosive to metals as well as ceramics such as alumina ($Al_2O_3$) that are typically used in conventional catalysts.

Use of high-energy-density ionic salt monopropellants, including ionic salt monopropellants, as a replacement for the current state-of-art hydrazine monopropellant can potentially increase thruster performances. However, use of hot burning high-energy-density ionic monopropellants requires use of catalysts, chamber materials, and bed plates in the thruster/reaction engine that can survive in the monopropellant decomposition environment at temperatures exceeding 1600° C. and as high as 2000° C.

Conventional, prior art catalysts such as Ir/$Al_2O_3$, Pt/$Al_2O_3$, LCH-210, LCH-207, LCH-227, Shell 405 or S-405 that were developed for use with hydrazine cannot withstand the higher operating temperatures and the more corrosive environment encountered in decomposing high-energy-density HAN-based ionic salt monopropellants.

$ZrO_2$ is an amphoteric refractory oxide and has demonstrated a good acid resistance in HAN thruster environments. However, it suffers from a destructive tetragonal-to-monoclinic phase transformation due to a volumetric change of 3%-5% or more associated with this phase transformation. Repeated heating and cooling cycles, such as those encountered in a rocket engine, would result in a complete loss of the mechanical integrity of $ZrO_2$.

Stabilizers, typically MgO, CaO, $Y_2O_3$, $La_2O_3$ or $CeO_2$, are added in necessary concentrations to fully stabilize $ZrO_2$ in the cubic phase or to partially stabilize $ZrO_2$ in tetragonal phase to provide transformation toughening and prevent the spontaneous tetragonal-to-monoclinic phase transformation and destruction of the material that would otherwise occur upon heating and cooling over a given temperature range as described above. However, these stabilizers are all basic and are susceptible to acid-base reactions in acidic environments such as those encountered in rocket engines operating with ionic salt-based monopropellants. Partially stabilized (t-$ZrO_2$) or fully stabilized (c-$ZrO_2$) goes through an aging process where the basic stabilizers come out of solid solution and subsequently react with the acidic species in the HAN thruster environment. This acid-base reaction effectively removes the basic stabilizer from the zirconia and thus increases the rate of precipitation of the stabilizers from $ZrO_2$ and accelerates the aging and destabilization of $ZrO_2$. The sequence of precipitation and removal by acid-base reaction prevents the basic stabilizer, once precipitated, from going back into solid solution with $ZrO_2$ upon heating and re-stabilizing the material. In addition, some of the conventional stabilizers mentioned here, such as MgO and CaO, are extremely hydrophilic and thus after precipitation from $ZrO_2$ may potentially be removed from the material in the presence of water vapor or steam that can exist in the thruster environment.

Problems observed during rocket engine tests containing conventional catalysts with new monopropellants include excessive sintering of catalyst, void formation, increase in pressure drop, fracturing of catalyst granules, fine formation, fragmentation of the catalyst granules due to thermal shock, leaching of the catalyst by acids, and rapid loss of catalyst activity. Catalysts such as LCH-237 and Sienna's SSC-0103 that consist of an Ir coated $ZrO_2$-based carrier containing traditional stabilizers such as $CeO_2$, $Y_2O_3$, or CaO can provide over 30 minutes of lifetime but some missions require longer lifetimes. The lifetime of these catalysts are limited by the aging of the stabilized $ZrO_2$ carriers, and leaching of the stabilizers by acids or steam during service that leads to fracturing of catalyst granules, fine formation, fragmentation of the catalyst granules due to thermal shock, and rapid loss of catalyst activity.

Ceramic materials that have been evaluated as catalyst carriers for use with HAN-based ionic salt monopropellants include transition metal oxides such as $Al_2O_3$, $TiO_2$, $ZrO_2$, $CeO_2$—$ZrO_2$, $Y_2O_3$—$ZrO_2$ (Kirchnerova, J., Klvana, D. (2000) "Design Criteria for High Temperature Combustion Catalysts," *Catalysis Lett*, Vol. 67, p. 175), refractory carbides and nitrides such as SiC and $Si_3N_4$ (Rodrigues, J. A. J et al., (1997), "Nitride and Carbide of Molybdenum and Tungsten as Substitutes of Iridium for the Catalyst Used for Space Communication", *Catalysis Lett.*, Vol. 45, P. 1-3), transition metal-based and alkaline earth-based perovskites (Savrun, E. and Schmidt, E. W., (2001), "High Temperature Catalyst for Nontoxic Monopropellant", Air Force Research Laboratories SBIR Phase I Final Report, AFRL-PR-ED-TR-2001-0012; Savrun, E. et al., "Novel Catalysts for HAN/HEHN Based Monopropellants", NASA Glenn Research Center SBIR Phase I final Report, NAS3-02025) and transition metal substituted lanthanum-strontium hexaaluminates (Tejuca, L. G., Fierro, J. L. G., and Tascon, J. M. D., (1989) "Structure and Reactivity of Perovskite-Type Oxides", *Adv. Catalysis, Vol.* 36, P. 237). The combined stabilizing effects and corrosion resistance of $In_2O_3$ in $ZrO_2$ are cited in U.S. Pat. No. 5,288, 205 to Jones, R., 1994, "India-stabilized Zirconia Coating for Composites," and in the following reference: Jones, R. L. and Mess, D. 1992, "India as a Hot Corrosion-Resistant Stabilizer for Zirconia," Journal of American Ceramics Society, volume 75, pages 1818-1821. The combined stabilizing effects and corrosion resistance of $Sc_2O_3$ in $ZrO_2$ are cited in Jones, R. L., 1989 "Scandia-stabilized Zirconia for Resistance to Molten Vanadate-sulfate Corrosion," Surface and Coatings Technology, volume 39/40, pages 89-96. The combined stabilizing effects and corrosion resistance of $SnO_2$ in $ZrO_2$ are cited in U.S. Pat. No. 5,312,585 to Jones, R. L., 1994, "Corrosion Inhibition in High Temperature Environment". The combined stabilizing effects of $Ga_2O_3$ in $ZrO_2$ and its resistance to water or steam are cited in U.S. Pat. No. 5,279,995 to Hiroaki Tanaka et al., 1994, "Zirconia Ceramics."

SUMMARY OF THE INVENTION

Ceramic catalyst carriers that are mechanically, thermally and chemically stable in a HAN-based ionic salt monopropellant decomposition environment, catalysts comprising the ceramic catalyst carriers and a catalytically active coating, and methods of producing the stabilized ceramic catalyst carrier and of producing the ceramic catalyst are disclosed and described in the various preferred embodiments of the invention below.

The ceramic catalyst carriers of the present invention are acid resistant fully or partially stabilized zirconia-based or hafnia-based ceramics with high mechanical, chemical and thermal stability in the rocket engine environment and therefore are suitable for preparation of catalysts for the decomposition of ionic salt (including HAN-based) monopropellants. The ceramic catalyst carriers of the present invention have various advantages, particularly when compared to previous materials, including excellent thermal shock resistance, good compatibility with catalytically active coatings (e.g., active metal coatings) and coating deposition processes, high thermal stability up to and beyond 1800° C., chemical resistance to steam, nitrogen oxides and nitric acid, resistance to sintering to prevent void formation, and the absence of phase transitions associated with volumetric changes at temperatures up to and greater than 1800° C. In particular, the zirconia-based or hafnia-based ceramic catalyst carriers of the present invention utilize non-conventional metal oxide stabilizers that are less susceptible to corrosion, leaching, and/or aging (destabilization) in the presence of acids and/or steam than conventional stabilizers such as MgO, CaO, $Y_2O_3$, $CeO_2$, or $La_2O_3$ or other lanthanides; thus resulting in zirconia-based or hafnia-based ceramic with improved chemical stability and resistance to aging.

In one embodiment, the present invention provides ceramic catalyst carriers comprising of partially or fully stabilized zirconia ($ZrO_2$) or hafnia ($HfO_2$) containing one or more of the following stabilizers: $Cr_2O_3$, $Sc_2O_3$, $In_2O_3$, $SnO_2$, $Ga_2O_3$, $Sb_2O_3$. The resistance of stabilized zirconia ($In_2O_3$—$ZrO_2$, $Sc_2O_3$—$ZrO_2$ $SnO_2$—$ZrO_2$ or $Ga_2O_3$—$ZrO_2$) to acids such as nitric acid and nitrogen oxides that form in ionic salt based propellant combustion chambers at high temperatures is not discussed in the cited references, nor is use of $In_2O_3$—$ZrO_2$, $Sc_2O_3$—$ZrO_2$, $SnO_2$—$ZrO_2$ or $Ga_2O_3$—$ZrO_2$ as catalyst substrates or in catalysts for propulsion technologies. Any reference to the use of $Cr_2O_3$ or $Sb_2O_3$ as stabilizers to increase corrosion resistance of stabilized zirconia was not found in the patent literature.

In one embodiment, the present invention provides ceramic catalyst carriers comprising of partially or fully stabilized zirconia ($ZrO_2$) or hafnia ($HfO_2$) containing one or more of the following stabilizers described above such as $Cr_2O_3$, $Sc_2O_3$, $In_2O_3$, $SnO_2$, $Ga_2O_3$, $Sb_2O_3$, and one or more of a conventional stabilizer such as MgO, $Y_2O_3$, CaO, $La_2O_3$, $CeO_2$, or other lanthanides.

In one embodiment, the ceramic catalyst carriers described here are produced by traditional ceramic processing techniques such as reactive sintering, sol-gel, or co-precipitation.

In another embodiment, the ceramic catalyst carriers described here are produced in the form of spheres using a technique described in Savrun and Sawhill, 2010, "High Temperature Catalysts for Decomposition of Liquid Monopropellants and Method for Producing the Same," U.S. patent application Ser. No. 12/942,364, the contents of which are incorporated by reference.

In one embodiment, the partially or fully stabilized zirconia ($ZrO_2$) or hafnia ($HfO_2$) catalyst carrier materials described here are used as a wash-coat or coating on a carrier that is comprised of another high temperature ceramic material, such as a perovskite with the formula $ABO_3$ or non stoichiometric perovskite with the formula $AB_{1+y}O_{3+2y}$, described in U.S. patent application Ser. No. 12/942,364 that has a lower resistance to corrosion and/or aging in the present of acids, steam, ionic propellants, or ionic propellant combustion products.

In an additional embodiment, the present invention provides catalysts comprising the ceramic catalyst carrier as described above and an active metal coating which comprises about 0.5% to about 40% by weight of one or more metals selected from the group consisting of platinum, rhodium, ruthenium, rhenium, osmium and iridium.

In certain embodiments, the active metal coating of the catalyst comprises iridium, iridium/rhodium alloy, iridium/osmium alloy, or combinations thereof.

The ceramic catalyst carriers of the present invention are particularly useful for the preparation of catalysts for the decomposition of high-energy-density ionic salt monopropellants, including HAN-based ionic salt monopropellants, in the reaction engines of satellites and rockets. However, it should be understood that the ceramic catalyst carriers and catalysts of the present invention can be used with other propellants, including hydrazine and hydrazine derivatives and bipropellants, nitrous oxide-based monopropellants and bipropellants, and for other applications, including decomposition of nitrogen oxide compounds (e.g., $NO_x$ compounds or $N_2O$) in automotive or gas abatement applications.

In yet further embodiments, the stabilized ceramic is used in other parts of the rocket engine which must also survive highly corrosive, oxidizing environments at temperatures of 1600° C.-2000° C. without losing their mechanical integrity. These conditions are achieved in the reaction chamber, or thrust chamber, as well as in the catalyst bed plate, in a rocket engine using hot-burning, high-energy density ionic salt monopropellants.

The thrust chamber and bed plate materials of a rocket engine using high-energy density ionic salt monopropellants must have the following properties: (i) thermal and chemical stability, corrosion resistance, and oxidation resistance in a combustion environment at temperatures of 1600° C.-2000° C., (ii) thermal shock resistance to withstand sudden temperature changes, and (iii) mechanical strength and fracture toughness to handle stresses from vibration, chamber pressure, and flight acceleration both at room temperature and high temperature.

Fully or partially stabilized zirconia and hafnia materials under this invention can be used to construct thrust chambers, catalyst beds and catalyst bed plates, throats, or exit nozzles for rocket engines that operate on high-energy-density monopropellants because of their high thermochemical stability in oxidizing environments and their high mechanical strength at high temperatures. These materials can also be used as a liner or coating for metallic thrust chambers and bed plates. These materials may also be used to construct thrust chambers, components inside thruster chambers, or as thrust chamber liners in bipropellant or solid propellant thrusters.

DETAILED DESCRIPTION OF EXEMPLARY EMBODIMENTS OF THE INVENTION

Figure 1:
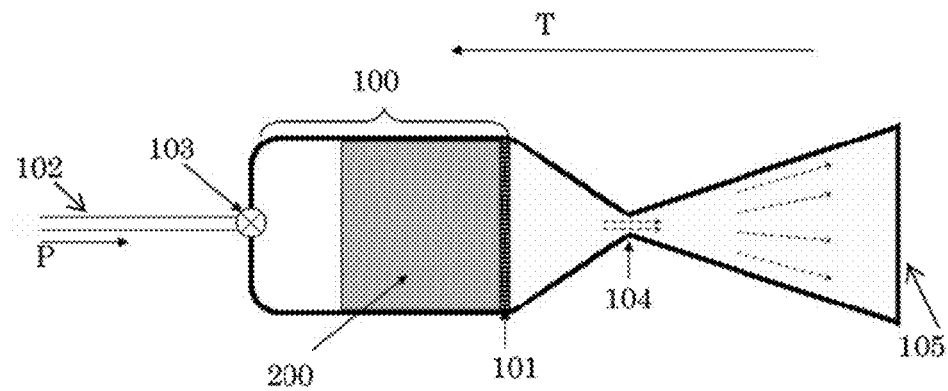
FIG. 1 is a schematic diagram of a monopropellant thruster engine in which a catalyst bed is supported by a bed plate in the thruster/reaction chamber. Monopropellant thruster engine includes thruster/catalyst chamber 100. Within chamber 100 is catalyst bed 200, supported on catalyst bed plate 101. Propellant P passes down feed line 102, and injector 103 injects it into chamber 100. Upon reaction with the catalyst, it decomposes, heating and expanding. The products of decomposition pass through bed plate 101, through throat 104, and out exit cone or nozzle 105, generating thrust T.

Stabilizing $ZrO_2$ with an oxide that is (i) more acidic, (ii) less soluble in acids, and/or (iii) less hydrophilic significantly improves the stability of stabilized $ZrO_2$ catalyst substrates in acidic, steam containing HAN thruster environments.

We have identified oxides that can be used as stabilizers for $ZrO_2$ in catalyst substrates with higher chemical stabilities than the conventional stabilizers. These substrates also have thermochemical stability up to and beyond 1800° C. for use in HAN thruster environments. The stabilizers identified in this invention for use in $ZrO_2$-based catalyst substrates for use in HAN thrusters include $SnO_2$, $Sb_2O_3$, $Ga_2O_3$, $In_2O_3$, $Cr_2O_3$, and $Sc_2O_3$, and combinations thereof, for example $ZrO_2$—$Sc_2O_3$—$In_2O_3$. The stabilizers identified in this invention may be used together with one or more conventional stabilizers such as MgO, $Y_2O_3$, CaO, $La_2O_3$, $CeO_2$ and other lanthanides, for example, $ZrO_2$—$Sc_2O_3$—CaO.

Use of one more of the identified oxides, for example, $SnO_2$, $Sb_2O_3$, $Ga_2O_3$, $In_2O_3$, $Cr_2O_3$, and/or $Sc_2O_3$, in combination with or as replacements for conventional stabilizers in $ZrO_2$, may increase its resistance to corrosion by acids and provide longer lifetimes during use with HAN-based ionic salt monopropellants that can form acidic species such as nitric acid ($HNO_3$) during combustion. In addition, the higher acid resistance of the identified materials may prevent or reduce degradation that may occur during deposition of the active metal layer via wet impregnation or other wet chemical methods that employ use of an acidic metal salt solution deposition process. For example, deposition of iridium (Ir) can be carried out via wet impregnation using dihydrogen hexachloroiridic acid ($H_2IrCl_6 \cdot 6H_2O$) aqueous solutions that contain a high concentration of hydrogen chloride (HCl) acid. With poor acid resistance such as CaO-stabilized $ZrO_2$, the basic oxide CaO may react with HCl or water during deposition of the active metal layer via wet impregnation. This is consistent with the observation that upon placing $ZrO_2$-based catalyst substrates containing CaO in $H_2IrCl_6 \cdot 6H_2O$ or HCl aqueous solutions the pH of the solutions rises significantly.

Use of one more of the identified oxides in this patent, for example, $SnO_2$, $Sb_2O_3$, $Ga_2O_3$, $In_2O_3$, $Cr_2O_3$, and/or $Sc_2O_3$, in combination with or as replacements for conventional stabilizers in $ZrO_2$, may increase its resistance to aging thus increase its resistance to destabilization in water, acid, or steam environments.

In certain particular embodiments, the present invention provides catalysts comprising the ceramic catalyst carrier as described above containing $ZrO_2$ as the base material in which $HfO_2$ is used as the base material or the base material is comprised of both $ZrO_2$ and $HfO_2$.

In other embodiments, the present invention provides catalysts comprising the stabilized $ZrO_2$ or $HfO_2$ catalyst substrates described here as a wash-coat or coating on another type high temperature ceramic catalyst support.

In certain particular embodiments, the present invention provides catalysts comprising the ceramic catalyst carrier as described above and an active metal coating which comprises about 0.5% to about 40% by weight of one or more metals selected from the group consisting of platinum, rhodium, ruthenium, osmium, rhenium, and iridium.

In certain particular embodiments, the active metal coating of the catalyst comprises iridium or iridium/rhodium, iridium/osmium, iridium/osmium/rhodium alloys.

In other embodiments, the present invention provides catalysts comprising the ceramic catalyst carrier as described above and a catalytically active ceramic material.

Various methods can be used to apply catalytically active materials to the surface of the ceramic catalyst carriers of the present invention. For example, with respect to active metal coatings, wet deposition processes such as incipient wetness techniques, wet soaking techniques, ion exchange techniques and wet spraying techniques using salt solutions of the metal can be used. Other useful techniques for the application of active metal coatings include, for example, chemical vapor deposition and sputtering.

One exemplary method for the deposition of iridium on the ceramic catalyst carriers of the present invention involves wet deposition of an iridium chloride salt solution followed by heat-treatment at about 300° C. to about 400° C. in air to stabilize the iridium chloride salt, and reduction in flowing hydrogen ($H_2$) or a gaseous mixture containing $H_2$ at temperatures in the range of about 400° C. to about 1000° C., to form Ir particles. It is desirable that the reduction temperature be about 500° C. to about 600° C.

Various methods can be used to prepare the ceramic catalyst carriers and catalysts of the present invention including reactive sintering, sol-gel, co-precipitation, and the method described in U.S. patent application Ser. No. 12/942,364 for fabricating spherical ceramic catalyst carrier granules.

EXAMPLES

Example 1

Production of scandia stabilized zirconia ($ZrO_2$—$Sc_2O_3$) granules with 10% mol $Sc_2O_3$, using flash-freeze process and reactive sintering process described in U.S. patent application Ser. No. 12/942,364 for fabricating spherical ceramic catalyst carrier granules.

Necessary amounts of $Sc_2O_3$ and $ZrO_2$ powders to give a mole ratio of $ZrO_2/Sc_2O_3=90/10$ and total solids loading of approximately 15% vol were dispersed in water by ball-milling using an ammonium polyacrylate type dispersant. After milling is complete, a water-soluble binder such as polyvinyl alcohol was added to the slurry at a concentration of 3.0% by weight to the powder (solids). The milled slurry was dispensed into a cold hexane bath held at a temperature of −60° C. using a spray atomizer and feed pressure of 2 psi while keeping the spray nozzle at least 2 cm above the height of the hexane. The flash-frozen granules were then removed from the hexane and placed in a freeze-dryer sample chamber held at a temperature of −20° C. to insure the granules did not melt. The pressure inside the freeze-dryer chamber was reduced to <150 mtorr vacuum while maintaining the given temperature, then the temperature was slowly increased to room temperature while under vacuum causing the water in the granules to sublime. The resulting precursor ("green") granules were removed from the freeze-dryer and placed in a muffle furnace for binder removal. The binder was removed from the green granules by heating to 200° C. to 550° C. in flowing air. The granules are immediately transferred to an open tube furnace and heat-treated at temperatures >1400° C. to facilitate reactive sintering and formation of scandia stabilized zirconia granules with 10 mol % $Sc_2O_3$.

Figure 2:
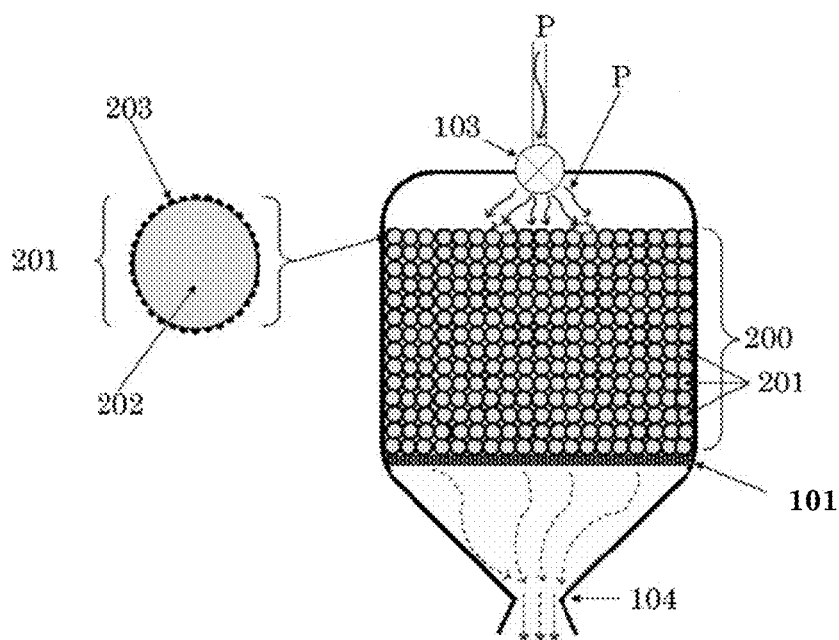
FIG. 2 is an enlarged schematic of the thruster/catalyst chamber in FIG. 1 that shows the monopropellant impinging on the catalyst bed and igniting and decomposing to create thrust. As is shown in FIG. 2, propellant P is injected into the thruster/catalyst chamber where it contacts catalyst bed 200. Catalyst bed 200 can be made up of many individual catalyst granules 201. In an embodiment, catalyst granules 201 include catalyst carrier or substrate 202 which is coated with a catalytically active metal 203. In an embodiment of the invention, catalyst carrier or substrate 202 consists of a ceramic support, e.g., partially or fully stabilized zirconia or hafnia, and catalytically active metal 203 may include iridium particles.
Figure 3:
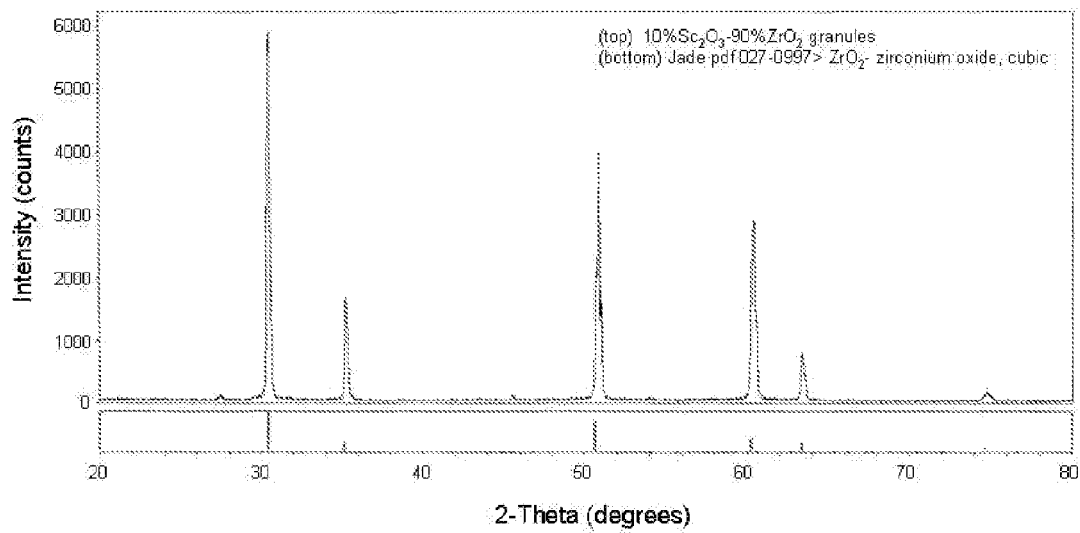
FIG. 3 is an X-ray diffraction pattern for scandia ($Sc_2O_3$) stabilized zirconia ($ZrO_2$) granules with 10 mol % $Sc_2O_3$ (90% $ZrO_2$-10% $Sc_2O_3$) described in Example 1.
Figure 4:
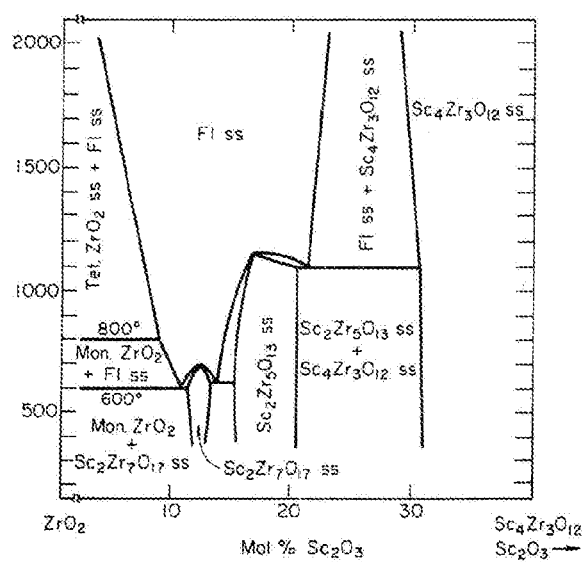
FIG. 4 is the phase diagram for the $ZrO_2$—$Sc_2O_3$ system. 90% $ZrO_2$-10% $Se_2O_3$ is an example of an acid resistant stabilized zirconia system described in this patent.

The X-ray diffraction pattern for scandia stabilized zirconia granules with 10 mol % $Sc_2O_3$ described in this example in FIG. 1 shows they are a fully stabilized cubic zirconia. This is consistent with the phase diagram for $ZrO_2$—$Sc_2O_3$ in FIG. 2 that shows 10% $Sc_2O_3$-90% $ZrO_2$ is cubic fluorite solid solution (Fl ss) above approximately 700° C.

Example 2

Coating of $ZrO_2$—$Sc_2O_3$ granules from Example 1 with iridium (Ir).

The $ZrO_2$—$Sc_2O_3$ granules produced in accordance with Example 1 herein above were coated with iridium (Ir) via wet deposition using a dihydrogen hexachloroiridic acid solution to give a loading of 5%-10% by weight Ir.

While various embodiments of the invention have been illustrated and described, as noted above, many changes can be made without departing from the spirit and scope of the invention. Also, some method steps may be performed in a different order than that described or concurrently with other steps. Accordingly, the scope of the invention is not limited by the disclosure of the particular embodiments disclosed herein. Instead, the invention should be determined entirely by reference to the claims that follow. All publications and patents mentioned herein are incorporated herein by reference in their entirety.

The embodiments of the invention in which an exclusive property or privilege is claimed are defined as follows:

1. A stabilized ceramic catalyst comprising:
    a ceramic selected from the group consisting of zirconia ($ZrO_2$), hafnia ($HfO_2$), and a mixture thereof;
    at least one stabilizer selected from the group consisting of $In_2O_3$, $SnO_2$, $Ga_2O_3$, and $Sb_2O_3$;
    a catalytically active metal; and
    wherein the ceramic is formed as a plurality of particles and housed within a catalyst bed for a rocket engine.

2. A stabilized ceramic catalyst comprising:
    a ceramic selected from the group consisting of zirconia ($ZrO_2$), hafnia ($HfO_2$), and a mixture thereof;
    at least one stabilizer selected from the group consisting of $In_2O_3$, $SnO_2$, $Ga_2O_3$, and $Sb_2O_3$;
    a catalytically active metal; and
    wherein the ceramic is formed as a plurality of particles and housed within a thrust chamber for a rocket engine.

3. A stabilized ceramic catalyst comprising:
    a ceramic selected from the group consisting of zirconia ($ZrO_2$), hafnia ($HfO_2$), and a mixture thereof;
    at least one stabilizer selected from the group consisting of $In_2O_3$, $SnO_2$, $Ga_2O_3$, and $Sb_2O_3$;
    a catalytically active metal; and
    wherein the ceramic is formed as a plurality of particles and housed within a catalyst bed or a thrust chamber for a rocket engine, the ceramic further comprising at least one second stabilizer, the second stabilizer comprising one or more of MgO, $Y_2O_3$, CaO, or a lanthanide.

4. The stabilized ceramic catalyst of claim 3 wherein the catalytically active metal comprises at least one metal selected from the group consisting of platinum, rhodium, ruthenium, rhenium, osmium, iridium, iridium/rhodium alloy, and iridium/osmium alloy.

5. The stabilized ceramic catalyst of claim 3 wherein the catalytically active metal is dispersed on the surface of the plurality of stabilized ceramic particles.

6. The stabilized ceramic catalyst of claim 3, wherein the ceramic is formed from a mixture of zirconia and hafnia.

* * * * *